D. S. CROSBY.
CHEESE MOLD.
APPLICATION FILED OCT. 18, 1917.
1,261,364.
Patented Apr. 2, 1918.
2 SHEETS—SHEET 1.
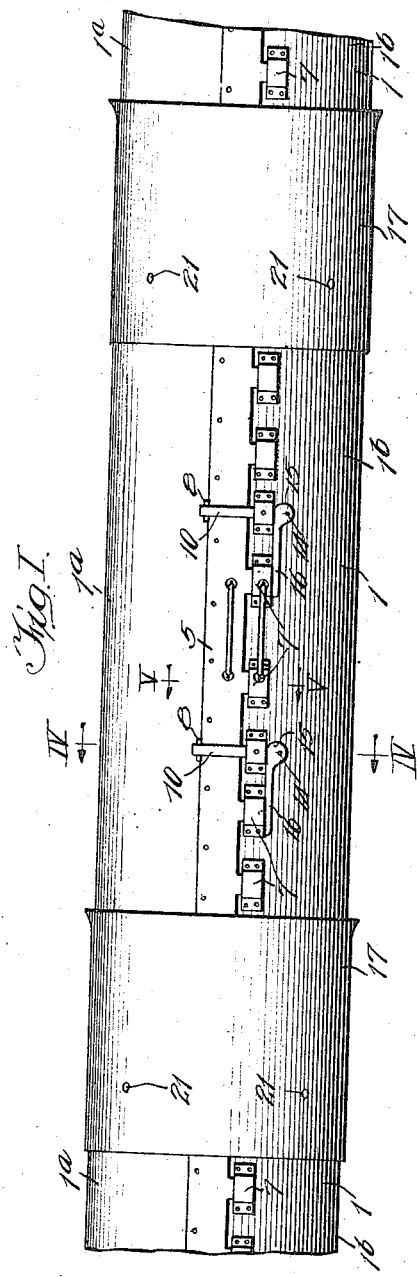
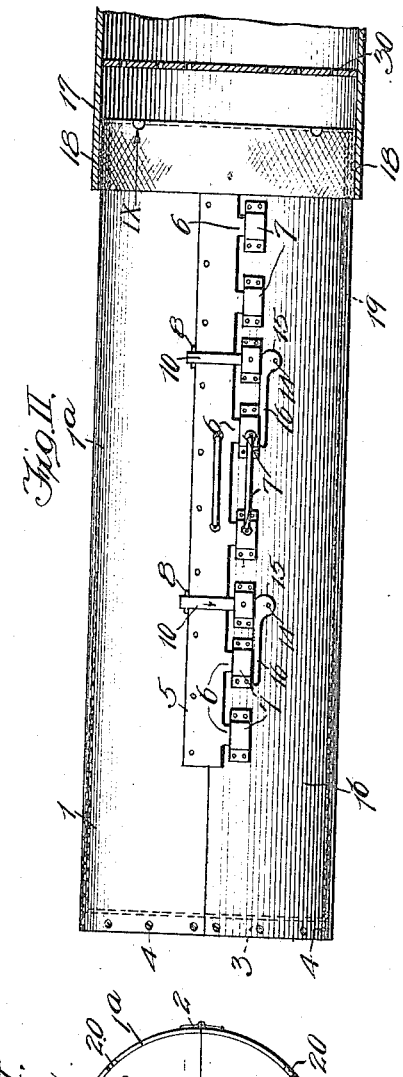
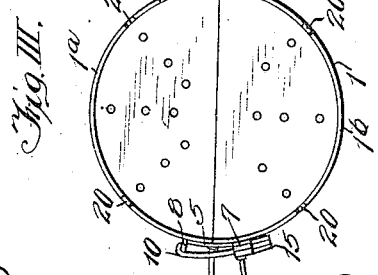
Witnesses:
W. Kilroy
Harry R. L. White
Dell S. Crosby Inventor.
By L. W. Hopkins
Atty.

D. S. CROSBY.
CHEESE MOLD.
APPLICATION FILED OCT. 18, 1917.
1,261,364.
Patented Apr. 2, 1918.
2 SHEETS—SHEET 2.
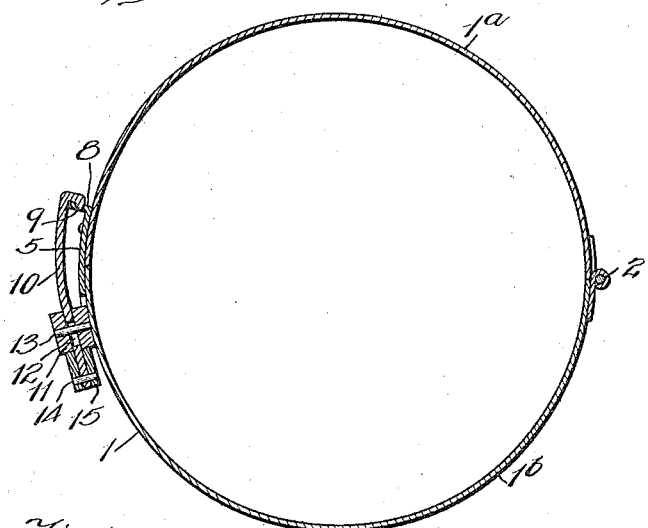
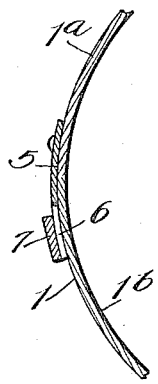
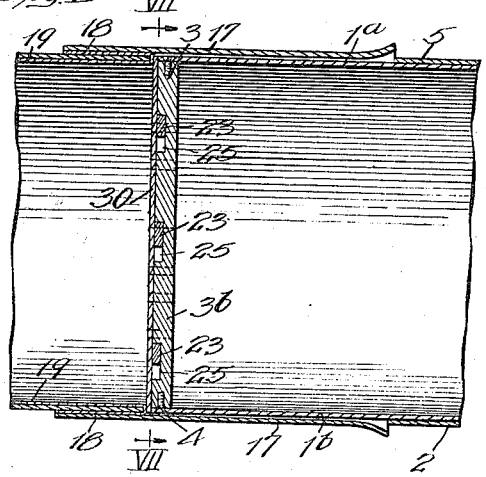
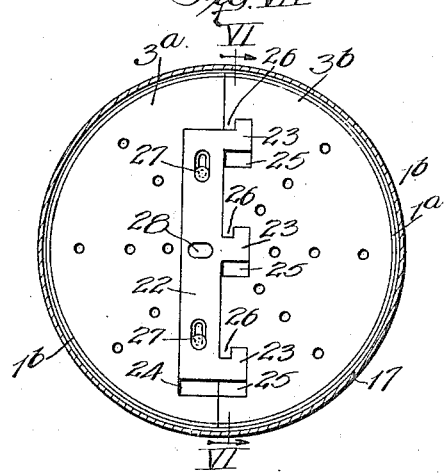
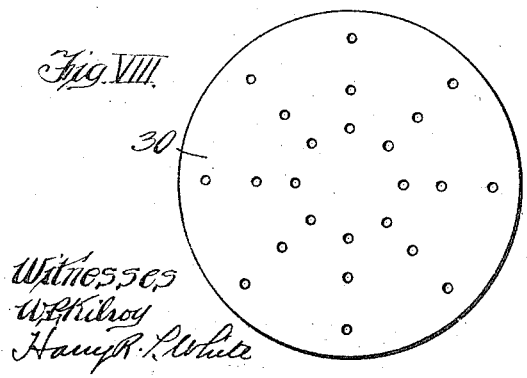
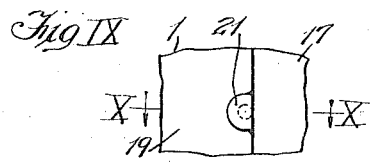
Witnesses
W. Kilroy
Harry R. White
Dell S. Crosby  Inventor
By D. W. Hopkins
Atty.

UNITED STATES PATENT OFFICE.

DELL S. CROSBY, OF CHICAGO, ILLINOIS.

CHEESE-MOLD.

1,261,364.

Specification of Letters Patent.

Patented Apr. 2, 1918.

Application filed October 18, 1917. Serial No. 197,253.

*To all whom it may concern:*

Be it known that I, DELL S. CROSBY, a citizen of the United States, residing in Chicago, in the county of Cook and State of Illinois, have invented certain new and useful Improvements in Cheese-Molds, of which the following is a specification.

As heretofore practised in the art, cheese molds have been used both singly, or individually, and in gangs or series in connection with a suitable press adapted to the purpose. The present invention has nothing whatever to do with the construction of the press, excepting that it contemplates the use of a press of such construction as will be efficient in carrying out the objects of the invention.

Heretofore the so-called "hoops" of cheese molds have been continuous, circumferentially, and either cylindrical throughout their length or tapered from end to end to facilitate the removal of the cheese after it has been compressed. Both of these constructions are objectionable, because of the difficulty in removing the cheese after compression.

The principal object of the present invention is to provide a mold that will permit the molded cheese, after compression, to be removed from the mold with ease and facility.

To this end the invention consists, primarily, in providing a mold the "hoop" of which is divided longitudinally so that it may be opened up longitudinally after the molding operation is completed, and the molded cheese lifted out laterally.

The invention also contemplates certain details of construction that are either necessary or desirable in carrying out the main primary feature above mentioned.

To be more specific each mold whether used separately and individually, or, as is more customary, when a number of them are arranged in a gang or series, each of them has a "hoop" divided longitudinally, so that its longitudinal parts or sections may be closed together when the curd is to be compressed or opened up or separated when the molded cheese is to be removed and improved means are provided for holding the hoop sections closed while the pressure is being exerted upon its contents and for permitting it to be opened up when the pressing operation is completed.

Also, means are provided for holding in place, during the pressing operation, the cheese cloth or other fabric which is to form the jacket or outer covering of the molded cheese.

The invention also contemplates that each mold shall be of sufficient length to mold a block of cheese of say twelve or fifteen inches in length and weighing say ten to fifteen pounds and then, when this large block is molded, it shall be cut up transversely into a number of pieces of say one pound each, so as to make it more convenient to handle in the retail trade with customers or ultimate consumers. In carrying out this idea the longitudinally divided hoop has a decided advantage. It is contemplated that when the large block the length of the mold, is removed it shall be cut transversely into pieces of the desired size and weight: that these smaller pieces shall be replaced in the hoop with a follower between each piece and the next, and again subjected to pressure. If desired the raw severed face of each piece may have a piece of cheese cloth or other material applied to it, but this is not deemed to be absolutely necessary as the pressure will have a tendency to form a crust or rind which constantly hardens when exposed to the atmosphere.

The practice of the invention as above outlined not only provides blocks of a size particularly advantageous in supplying the retail trade, but it also provides them in such form as to require a minimum of handling, and hence of a maximum sanitary condition.

With these and other objects in view the invention consists in the features of novelty that are hereinafter described with reference to the accompanying drawings, which are made a part of this specification and in which—

Figure I is a side elevation on a small scale of one complete mold, fragments of two adjacent molds of a gang or series and the coupling sleeves by which they are coupled together, end to end.

Fig. II is a sectional elevation of one complete mold adapted to be used either individually, or in a gang or series as may be desired.

Fig. III is an end elevation of the hoop or main body portion thereof.

Fig. IV is an enlarged transverse section on the line IV—IV, Fig. I.

Fig. V is a fragmentary transverse section on the line V—V, Fig. I.

Fig. VI is a longitudinal section on the line VI—VI Fig. VII.

Fig. VII is a transverse section on the line VII—VII, Fig. VI.

Fig. VIII is a face elevation of one of the followers.

Fig. IX is an enlarged fragmentary elevation of some of the parts viewed approximately in the direction of the arrow IX, Fig. II.

Fig. X is a longitudinal section on the line X—X, Fig. IX.

The main body portion of the improved mold, or the portion thereof which corresponds, approximately, with what has heretofore been known as the "hoop" is shown at 1. It is of true cylindrical shape throughout its length and is made up of two semi-cylindrical sections or parts $1^a$ and $1^b$ which are connected, at one side, by a hinge 2, which permits the hoop to be opened up longitudinally. The two sections $1^a$ and $1^b$ come together in a butt joint at a point diametrically opposite the hinge 2, and at this point the two longitudinal sections are provided with coöperating fastening devices, by which said sections may be secured together to prevent their movement away from each other, or may be freed from each other to permit of their being separated, when desired.

The hoop, (as the part 1 will hereinafter be called) is closed at one end by head 3 consisting of two semi-circular disks which come together upon the diametrical line of division of the hoop 1. This head 3 is of metal and of considerable strength and is firmly secured in place in the hoop 1 by countersunk screws 4, or other suitable means so that the hoop is firmly strengthened and supported at this end.

Referring now to Fig. II of the drawings, which shows one complete mold adapted to be used either singly, i. e., individually, or in a gang or series, it will be seen that one of the longitudinal sections of the hoop—say the section $1^a$—has secured to its edge or margin opposite the hinge 2, a plate 5 which projects beyond the margin of section $1^a$ and overlaps the section $1^b$. The plate 5 has, on its outer edge, a number of tongues 6 which overlap the section $1^b$ and are adapted to enter sockets, carried by the section $1^b$ and are preferably formed by double offset or ⌐⌐-shaped plates or blocks 7 secured to the section $1^b$. Thus the margins of the sections $1^a$ and $1^b$ are braced and prevented from springing laterally relatively to each other.

For the purpose of firmly drawing together the abutting edges of the hoop sections $1^a$ and $1^b$ and preventing their separation under the influence of internal pressure, I provide the inner margin of the plate 5 with a plurality of lugs 8 each having through it an opening adapted to receive the reflexed end 9 of a slidable bolt or catch 10. This bolt engages its keeper (8) when retracted or drawn back, instead of when projected or forced outward, as is customary with bolts of ordinary construction. To this end it passes through an opening formed through a block 11, or its equivalent, secured to the section $1^b$. Where it passed through this opening the bolt is provided with a longitudinal slot 12 through which passes a pin 13 which has firm frictional contact with the block 11 whereby it is held in place. Thus the bolt is guided in its movements and the amplitude of its movements limited. To retract the bolt longitudinally, its rear end is pivotally connected by a pin 14 to a bifurcated cam 15 formed on a lever 16. This cam engages the block 11, so that when moved in one direction, it will retract the bolt as indicated by the arrow in Fig. II and this will draw the margins of the two sections $1^a$ and $1^b$ toward each other and tightly close the hoop.

The end of the hoop opposite the head 3 is open and telescopes with a sleeve 17. The internal diameter of this sleeve is slightly greater than the external diameter of the hoop 1, the difference being just sufficient to provide between them a space just sufficient to receive the reflexed margin 18 of a tube 19 of cheese cloth or other suitable fabric which extends from end to end of the hoop and forms an outer covering or jacket for the cheese when the molding operation is completed. In order to prevent the cheese-cloth from being forced out of place and wrinkled up when the pressure is applied as was the case with molds as heretofore constructed, the open end of the hoop 1 is provided with any desired number of notches 20 and the sleeve 17 is provided with a corresponding number of lugs or projections 21 which are adapted to register with the notches 20 and force portions of the cheese-cloth into them. Thus a firm grip is formed.

As shown in Figs. I and II the hoop section $1^a$ and $1^b$ project beyond the ends of the hinge 2 and clamping plate 5, and several features of the device are instrumental in preventing these projecting portions of the hoop from springing outward under the influence of the internal pressure. In the first place the head 3 is stout and the hoop sections $1^a$ and $1^b$ are firmly secured to it by the screws 4, or the like. Again when a number of molds are arranged end to end in a gang as indicated in Fig. I and as is a familiar practice in the art, the sleeves 17 embrace the projecting ends of the hoop sections and prevent their springing outward.

The two semicircular parts of the head 3 may be secured together by any suitable means, but preferably by a sliding catch consisting of a metal plate having an elongated rectangular body portion 22, from one margin of which projects any desired number of L-shaped lugs 23. The part 3ᵃ of the head has a rabbet 24 in which the rectangular portion 22 of the catch fits and is adapted to slide and the part 3ᵇ has notches 25 in which the lugs 23 fit, said notches being reëntrant at one end to provide shoulders 26, with which the lateral portions of the lugs 23 engage.

The catch is held in place by headed pins 27 which project from the section 3ᵃ of the head 3 and pass through longitudinal slots in the catch and have countersunk heads. The catch is provided with a finger hole 28 or the like for sliding it endwise to lock together or unlock the two sections 3ᵃ and 3ᵇ of the hoop-head 3.

The curd or cheese is not shown in any figure of the drawings, because to show it would be entirely unnecessary. Fig. II shows the parts in the positions that they occupy before the compressing operation is completed while Fig. VI shows the same parts in the position that they occupy when the compressing operation is completed.

In both of these figures there is a follower 30, one of which followers is placed in the sleeve 17 (or in each of them when a gang of molds is being used) so as to come in contact with the mass of curd with which the hoop, with its lining 19, has been filled. Pressure is then exerted on this follower in customary manner, and it is forced into the sleeve 17 until, compressing the curd in the hoop, it comes in contact with the end of said hoop, as shown in Fig. VI.

When a plurality of molds are arranged in a gang the head 3 of each hoop engages the follower 30 of the next mold, and so on, but the follower 30 of the last mold of the gang, or the single follower where only a single hoop is being used, is engaged by a suitable part of the press.

It should have been stated that the head 3 of each hoop or some other part of the mold is provided with openings for drawing off the liquid expressed from the curd in the pressing operation. This, however, is common to all cheese molds, and needs no further description here.

What I claim is:—

1. In a cheese mold, the combination of a split body portion, or hoop, formed of a plurality of longitudinal parts, or sections, which are adapted to be placed together, edge to edge, to form a tube, means for detachably connecting and holding together the meeting longitudinal edges of the hoop-sections during the compressing operation and permitting them to be disconnected to permit them to be spread apart to open up the hoop for freeing the molded cheese to facilitate its removal after the compressing operation is completed, and a sleeve telescoping with and surrounding an end of the split hoop whereby its end thus surrounded is prevented from spreading.

2. In a cheese mold, the combination of a body portion, or hoop, formed of a plurality of longitudinal parts, or sections, which are adapted to be placed together, edge to edge, to form a tube, means for detachably connecting and holding together the meeting longitudinal edges of the hoop-sections during the compressing operation and permitting them to be disconnected to permit them to be spread apart to open up the hoop for freeing the molded cheese to facilitate its removal after the compressing operation is completed, and a sleeve telescoping with and surrounding the open end of the split hoop whereby its end thus surrounded is prevented from spreading.

3. In a cheese mold, the combination of a body portion, or hoop, formed of a plurality of longitudinal parts, or sections, which are adapted to be placed together, edge to edge, to form a tube, means for detachably connecting and holding together the meeting longitudinal edges of the hoop-sections during the compressing operation and permitting them to be disconnected to permit them to be spread apart to open up the hoop for freeing the molded cheese to facilitate its removal after the compressing operation is completed, and sleeves telescoping with and surrounding the adjacent ends of hoops of adjacent molds, a number of said molds being arranged, end to end, in a gang or series.

4. In a cheese mold, the combination of a body portion or hoop comprising longitudinal parts or sections and a head made of segmental parts or sections corresponding in radial angular extent with the longitudinal sections of the hoop and means for detachably connecting the sections of the head so that they may be separated upon the radial lines of division of the hoop.

5. In a cheese mold, the combination of a body portion or hoop comprising longitudinal parts or sections and a head made of segmental parts or sections corresponding in radial angular extent with the longitudinal sections of the hoop and means for connecting the sections of the head so that they may be separated upon the radial lines of division of the hoop, said connecting means having a slidable catch suitably mounted upon one section of the head and means carried by an adjacent section of the head and adapted to be engaged by said slidable catch.

6. In a cheese mold, the combination of a split body portion, or hoop, formed of a plurality of longitudinal parts or sections which are adapted to be placed together, edge to edge, to form a tube, means for detachably connecting and holding together the meeting longitudinal edges of the hoop-sections during the compressing operation and permitting them to be disconnected to permit them to be spread apart to open up the hoop for freeing the molded cheese to facilitate its removal after the compressing operation is completed, and a head closing one end of the hoop, said head consisting of a disk fitting within the end of a hoop, and means connecting said disk to said hoop.

7. In a cheese mold, the combination of a body portion or hoop having in its end any desired number of notches, a tube of fabric occupying said body portion or hoop and having a portion reflexed over the end thereof, a sleeve surrounding the reflexed portion of said fabric, and lugs carried by said sleeve and corresponding in number and location with said notches, whereby portions of the fabric are pressed into said notches.

DELL S. CROSBY.

Witnesses:
L. M. HOPKINS,
IDA H. TODD.

Copies of this patent may be obtained for five cents each, by addressing the "Commissioner of Patents, Washington, D. C."